United States Patent [19]

Keckler et al.

[11] Patent Number: 4,775,962

[45] Date of Patent: Oct. 4, 1988

[54] MARINE SEISMIC STREAMER EMPLOYING VARIABLE APERTURE FLOW THROUGH SPACERS

[75] Inventors: William G. Keckler; Robert G. Zachariadis, both of Dallas, Tex.

[73] Assignee: Mobil Oil Corporation, New York, N.Y.

[21] Appl. No.: 32,203

[22] Filed: Mar. 27, 1987

[51] Int. Cl.⁴ .................................. G01V 1/38
[52] U.S. Cl. ................................ 367/154; 367/20; 174/101.5; 174/21 CA
[58] Field of Search ............... 181/111, 110, 112, 175, 181/233, 264; 367/14–20, 106, 130, 141, 144, 153, 154, 159, 165, 162, 166, 167, 169, 173, 176, 171, 911, 172, 177, 191; 114/242, 253; 340/850; 174/22 R, 23 R, 22 S, 24, 70 S, 101.5, 21 CA, 15 C; 138/44, 45

[56] References Cited

U.S. PATENT DOCUMENTS

| | | | |
|---|---|---|---|
| 2,206,259 | 7/1940 | Nield et al. | 181/233 |
| 3,299,391 | 1/1967 | Herrmann et al. | 439/94 |
| 3,319,734 | 5/1967 | Pavey, Jr. | 367/154 |
| 3,371,739 | 3/1968 | Pearson | 367/18 |
| 3,506,085 | 4/1970 | Loper | 367/144 |
| 3,518,677 | 6/1970 | Florian | 367/154 |
| 3,696,329 | 10/1972 | Hazelhurst | 367/154 |
| 3,798,345 | 3/1974 | Priarggia et al. | 174/15 C |
| 4,146,870 | 3/1979 | Ruehle | 174/78 |
| 4,204,188 | 5/1980 | Weichart et al. | 367/154 |
| 4,581,724 | 4/1986 | Zachariadis | 367/21 |
| 4,592,390 | 6/1986 | Boyd | 138/45 |
| 4,660,183 | 4/1987 | McGowan et al. | 367/15 |
| 4,689,774 | 8/1987 | Cameron | 367/20 |
| 4,736,345 | 4/1988 | Keckler et al. | 367/20 |
| 4,737,937 | 4/1988 | Keckler et al. | 367/20 |

OTHER PUBLICATIONS

U.S. patent application Ser. No. 031,055, Keckler et al., filed 3/27/87, Marine Seismic Streamer Stretch Section Employing Fluid Blocking Spacers, Grp 221, Mobil Dkt 3870.

U.S. patent application Ser. No. 031,056, Keckler et al., filed 3/27/87, Marine Seismic Streamer Employing Variable Hydrophone Density, Grp. 221, Mobil Docket 3874.

Primary Examiner—Brian S. Steinberger
Attorney, Agent, or Firm—Alexander J. McKillop; Michael G. Gilman; George W. Hager, Jr.

[57] ABSTRACT

A fluid filled marine seismic streamer employs a plurality of hydrophones spaced apart along its length to detect seismic reflection signals from subsurface formations below a water layer. A plurality of fluid blocking members are also spaced apart along the length of the streamer. A plurality of flow through spacers having varying flow through apertures are positioned between each hydrophone adjacent to a fluid blocking member that generates pressure pulses in the fill fluid of significant magnitude to be detected by such hydrophone. The size of the flow through apertures of such spacers progressively increases in a direction leading from the fluid blocking member toward the hydrophone.

4 Claims, 3 Drawing Sheets

MARINE SEISMIC STREAMER EMPLOYING VARIABLE APERTURE FLOW THROUGH SPACERS

BACKGROUND OF THE INVENTION

This invention relates to marine seismic exploration and, more particularly, to a marine seismic streamer configured to reduce tow noise on the recorded seismic data by employing spacers with variable apertures, along the length of the streamer.

In conducting a marine seismic survey, a seismic energy source is employed by an exploration vessel to generate a seismic signal, referred to as a seismic pressure wave, which is transmitted through the water layer into the subsurface formations. A portion of the signal is reflected from the subsurface reflecting interfaces back to the water layer where it is received by a seismic streamer being towed behind the exploration vessel. The streamer is comprised of a plurality of hydrophones which generate electrical signals in response to the received seismic signals. The hydrophones are spread along the length of the streamer and are electrically connected through the streamer to seismic recording instruments on board the exploration vessel. Such a marine seismic survey may be typically carried out with the exploration systems of the type described in U.S. Pat. No. 4,146,870 to W. H. Ruehle and U.S. Pat. No. 4,581,724 to R. G. Zachariadis wherein a seismic energy source and seismic streamer are towed through the water along a line of exploration.

In seismic marine operations numerous problems are encountered in the recording of seismic data that are not encountered during land operations. A primary one of these problems is tow noise generated by both the movement of the vessel and the streamer through the water as they traverse along the line of exploration.

It is, therefore, a primary object of the present invention to provide for a seismic streamer that can discriminate against such tow noise and thereby provide seismic signals with less distortion, more dynamic range, and broader frequency spectrum than provided by conventional seismic streamers. Seismic signals with lower distortion and broader dynamic range will resolve thin beds and stratigraphic traps more readily. Reducing noise will permit detection of deeper events and better resolution of events at all levels.

SUMMARY OF THE INVENTION

In accordance with the present invention, a fluid filled marine seismic streamer comprises a plurality of hydrophones spaced apart along the length of the streamer for detecting seismic reflection signals from subsurface formations below a water layer as the streamer traverses a line of exploration through the water layer. A plurality of fluid blocking members, such as bulkhead connectors or filler spacers are also spaced apart along the streamer. When these fluid-blocking members vibrate due to longitudinal mechanical excitation they may cause pressure pulses in the fill fluid that are of sufficient magnitude to be detected by the hydrophones as tow noise. A plurality of flow through spacers are located between such a fluid blocking member and an adjacent hydrophone to attenuate these pressure pulses.

The relative size of the flow through apertures of the spacers increases in a direction leading from the fluid blocking member toward the hydrophone.

In a more specific aspect, a first flow through spacer is positioned closer to the fluid blocking member than to the hydrophone. A second flow through spacer having a flow through aperture that is larger than in the first spacer is positioned closer to the hydrophone than to the fluid blocking member. A plurality of additional flow through spacers are located at spaced apart positions between the first and second spacers and have flow through apertures that increase in size from that of the first spacer to that of the second spacer as the additional spacers progress in position from the first spacer to the second spacer. Such increase in aperture size may be either linear or non-linear. In this manner, those spacers nearest the fluid blocking member reflect or attenuate fluid pressure pulses generated by the fluid blocking member under longitudinal vibration of the streamer, while those spacers nearest the hydrophone minimize any generation of fluid pressure pulses in the near vicinity of the hydrophone.

DESCRIPTION OF THE PREFERRED EMBODIMENT

Figure 1:
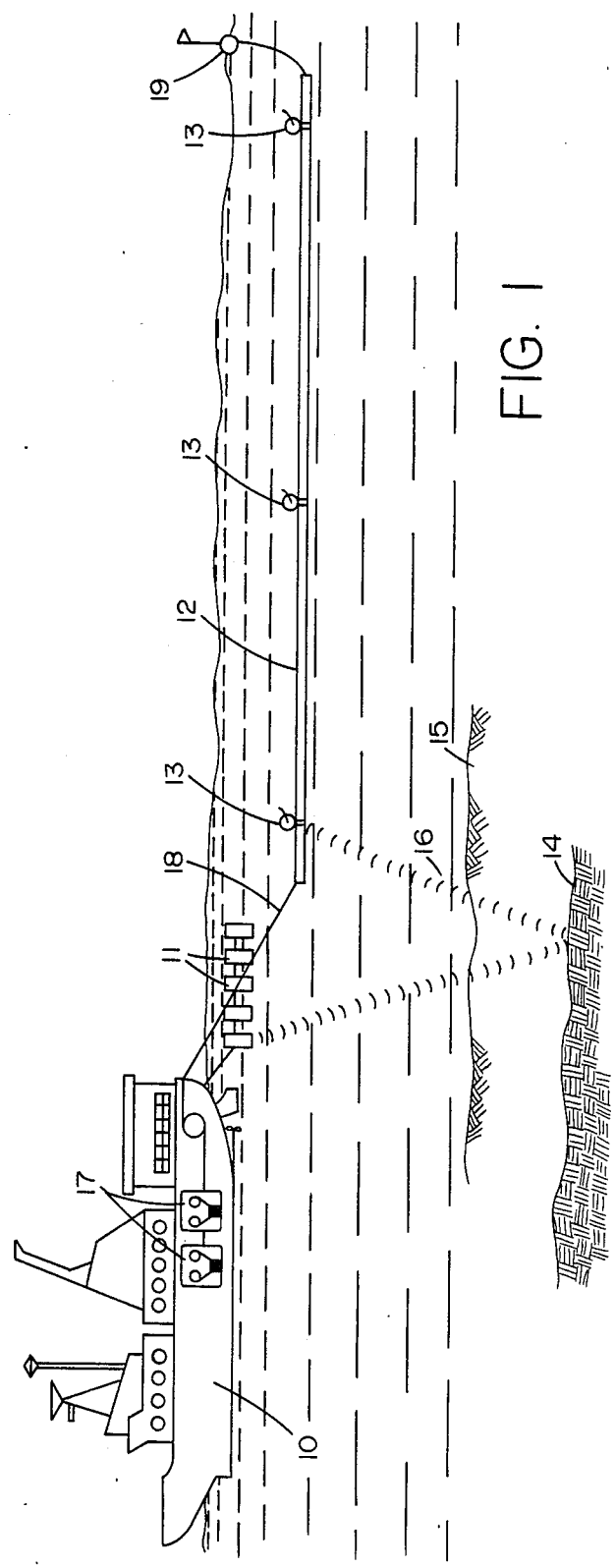
FIG. 1 illustrates a marine seismic exploration system with which the marine seismic streamer of the present invention may be utilized.

Referring to FIG. 1, there will be described a marine seismic exploration system with which the marine seismic streamer of the present invention may be employed. The seismic marine exploration vessel 10 traverses a line of exploration. The vessel 10 tows one or more seismic energy sources 11 and a seismic streamer 12 employing a plurality of hydrophones spaced along the length of the streamer. Seismic energy is generated in the water by the source 11 and reflections 16 of such energy from subsurface formations, such as illustrated at 14 below the water bottom 15, are detected by the plurality of hydrophones along he streamer 12 as seismic reflection signals. These seismic signals are transferred to data recording and processing equipment 17 on the vessel 10 by way of electrical wiring through streamer 12 and up streamer tow cable 18. FIG. 1 does not show conventional or state-of-the-art mechanical features of a streamer such as strain members, electrical cables, spacers, or even the hydrophones themselves. These features are clearly disclosed in numerous U.S. patents, for example, U.S. Pat. Nos. 3,299,397 and 3,319,734 to G. M. Pavey, Jr. et al.; U.S. Pat. No. 3,371,739 to R. H. Pearson; and U.S. Pat. No. 4,204,188 to H. Weichart et al. The streamer 12 may additionally be provided with one or more depth control devices 13 and a tail bouy 19. A typical seismic energy source 11 used in marine seismic exploration may comprise one or more air guns of the type described in U.S. Pat. No. 3,506,085 to G. B. Loper. A typical data recording and processing system 17 is the Texas Instruments Model DFS-V Digital Field Recorder.

Having described a typical marine seismic exploration system, there will now be described in more detail a typical marine seismic streamer.

Figure 2:
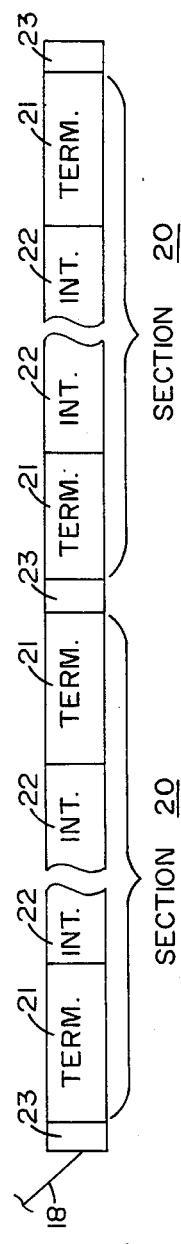
FIG. 2 illustrates the modular configuration of the marine seismic streamer of the present invention.

FIG. 2 shows such a streamer 12 divided into a plurality of streamer sections 20 coupled together by the bulkhead conectors 23. Each streamer section 20 is divided into a plurality of modules of convenient units of length, such as terminal modules 21 and intermediate modules 22. Each section is identical so that they can be interchanged as necessary for repair or replacement. In a preferred embodiment, these sections would be about 100 meters long and a typical streamer might comprise 35 such sections for a total length of approximately 3500 meters. Each section comprises a plurality of modules. Each module comprises a plurality of hydrophones spaced along the length of the module. Those hydrophones in each module are connected together to provide a single seismic signal output so as to increase signal strength and discriminate against directional noise. Also, a plurality of spacers are positioned along the length of each module for supporting the cylindrical outer hose of the seismic streamer. Such spacers are of cylindrical shape as shown in U.S. Pat. No. 3,518,677 to Florian and U.S. Pat. No. 3,696,329 to Hazelhurst.

The hydrophones along streamer 12 are particularly sensitive to tow noise. One such tow noise is in the form of a longitudinal vibration which travels along the length of the streamer. The vibration reaches the hydrophones as pressure waves induced by full or partial blockage of the flow of fill fluid within the streamer. Such a full blockage is provided by both conventional bulkhead connectors between the seismic streamer sections and by filler spacers near the ends of the seismic streamer sections. Such filler spacers and bulkhead connectors are in effect noise sources that convert strain in the streamer to hydrokinetic energy in the fill fluid in the terminal modules. Thus, the bulkhead connectors and the filler spacers act like pistons in generating short duration pressure pulses in the fill fluid in the near vicinity of the terminal modules. Such a partial blockage is provided by the flow through spacers along each streamer module. A spacer with a small aperture for fill fluid flow can also generate short duration pressure pulses in the fill fluid. It is a specific feature of the present invention to provide a marine seismic streamer that is designated to reduce the effect of such pressure pulses in the fill fluid along the seismic streamer. This is accomplished by altering the conventional flow through spacer design of uniform apertures from one end of each streamer section to the other end.

Figure 3:
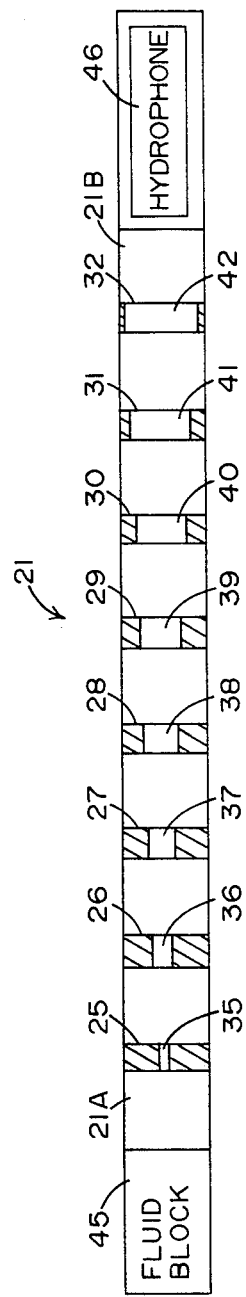
FIGS. 3 and 4 are graphical representations of the flow through spacer configuration of the present invention within the modules of the marine seismic streamer of FIG. 2.
Figure 4:
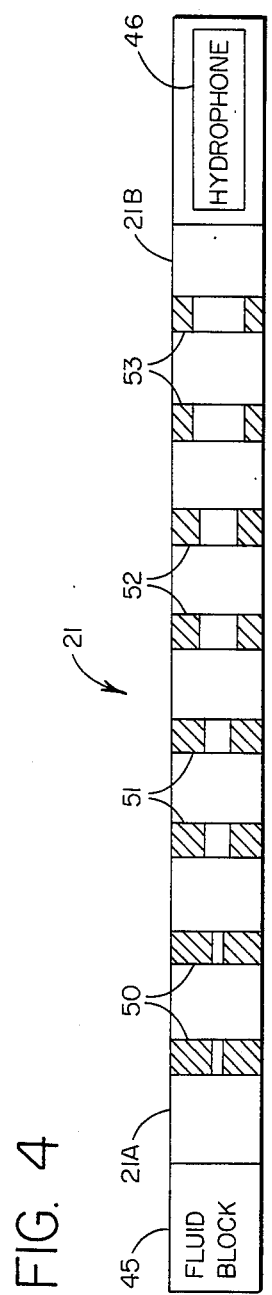

Referring to FIG. 3 there is shown a diagrammatic representation of a streamer module employing spacers with varying apertures for fill fluid flow in accordance with the present invention. The diagram is not intended to show conventional or state-of-the-art mechanical features of a streamer such as strain members, electrical conductors, hydrophones, or even the spacers themselves. These features are clearly disclosed in numerous U.S. Patents, for example, U.S. Pat. Nos. 3,299,397 and 3,319,734 to G. M. Pavey, Jr. et al.; U.S. Pat. No. 3,371,739 to R. H. Pearson; and U.S. Pat. No. 4,204,188 to H. Weichart et al.

FIG. 3 shows a plurality of flow through spacers 25-32 uniformly spaced along the module 21. Apertures 35-42 of spacers 25-32 respectively are shown as gradually increasing in flow through size from portion 21A toward portion 21B of module 21. This would be the preferable spacer configuration for a streamer module with a fluid blocking member 45, such as a bulkhead connector, or a filler spacer, at the end of portion 21A and a hydrophone 46 adjacent to portion 21B. More particularly a flow through spacer, such as spacer 25 with a relatively small aperture 35 is positioned adjacent the fluid blocking member within module portion 21A for the purpose of reflecting pressure pulses in the fill fluid generated by the fluid blocking member 45 in response to longitudinal vibration of the module 21 as the streamer moves through the water. In this manner pressure pulses that would otherwise travel along module 21 from blocking member 45 to hydrophone 46 are greatly attenuated.

A flow through spacer, such as spacer 32 with a relatively larger flow through size area 42, is positioned adjacent the hydrophone 46 within module portion 21B for the purpose of minimizing the generation of any pressure pulses in the fill fluid by such spacer 32 in the immediate vicinity of hydrophone 46.

However, since spacer 25 provides partial blockage to fill fluid flow, it can therefore also be a presure pulse generator, though not to the same extend as the fluid blocking member 45. Consequently, adjacent spacer 26 has a cross sectional area that is large enough to reflect pressure pulses from spacer 25, or that may have passed through aperture 35 of spacer 25, but at the same time has a larger flow through aperture than that of spacer 25 so that it generates even smaller pressure pulses in the fill fluid. Similarly spacers 27-32 are of increasing flow through apertures. This increase in aperture size of spacers 25-32 in a direction away from fluid blocking member 45 and toward hydrophone 46 provides for maximum attenuation of pressure pulses within the fill fluid by those spacers nearest the fluid blocking member and for minimum generation of pressure pulses by the spacer nearest the hydrophone. Such increase in aperture size can be either linear or non-linear from spacer-to-spacer so long as the increase is overall progressive from the spacer nearest the fluid blocking member to the spacer nearest the hyrophone. For example, spacers may be grouped in pairs, or more, of the same size so as to minimize the number of different size spacers required along the length of the streamer.

Even though one embodiment of the present invention has been described herein, it will be apparent to those skilled in the art that various changes and modifications may be made in the marine seismic streamer hydrophone configuration of the present invention without departing from the spirit and scope of the invention as set forth in the appended claims. Any such changes and modifications coming within the scope of such appended claims are intended to be included herein.

We claim:

1. A fluid filled seismic marine streamer, comprising:
    (a) at least one hydrophone for the detection of seismic reflection signals from subsurface formations below a water layer as the streamer is towed along a line of exploration through the water layer by a towing vessel comprising:
    (b) a fluid blocking member spaced along said streamer between said hydrophone and said towing vessel, said fluid blocking member generating pressure pulses that travel along said fluid filled streamer toward said hydrophone in response to longitudinal vibration of said streamer as it is towed through the water layer, and (c) a plurality of flow through spacers located between said hydrophone and said fluid blocking member having flow through apertures of increasing size in a direction leading from said fluid blocking member toward said hydrophone to provide increasing pressure pulse attenuation within said fluid filled streamer in said direction from said fluid blocking member toward said hydrophone.

2. The seismic marine streamer of claim 1 wherein said flow through apertures of said spacers increase linearly in a direction leading from said fluid blocking member toward said hydrophone.

3. The seismic marine streamer of claim 1 wherein said flow through apertures of said spacers increase non-linearly in a direction leading from said fluid blocking member toward said hydrophone.

4. The seismic marine streamer of claim 3 wherein at least some of said spacers are grouped in at least pairs having a same size of flow through aperture.

* * * * *